May 30, 1950   M. H. GWYNN   2,509,921
MANUFACTURE OF SPONGE IRON
Filed Nov. 30, 1945   3 Sheets-Sheet 1

INVENTOR
Marion H. Gwynn
BY Bacon & Thomas
ATTORNEYS

May 30, 1950  M. H. GWYNN  2,509,921
MANUFACTURE OF SPONGE IRON

Filed Nov. 30, 1945  3 Sheets-Sheet 2

INVENTOR
Marion H. Gwynn
BY Bacon & Thomas
ATTORNEYS

May 30, 1950 M. H. GWYNN 2,509,921
MANUFACTURE OF SPONGE IRON
Filed Nov. 30, 1945 3 Sheets-Sheet 3

INVENTOR
Marion H. Gwynn
BY Bacon & Thomas
ATTORNEYS

Patented May 30, 1950

2,509,921

UNITED STATES PATENT OFFICE 2,509,921

MANUFACTURE OF SPONGE IRON

Marion H. Gwynn, Mountain Lakes, N. J., assignor, by mesne assignments, to Benjamin Clayton, Houston, Tex., doing business as Refining Unincorporated Application November 30, 1945, Serial No. 632,077

1 Claim. (Cl. 13—27)

This invention relates to the manufacture of sponge iron and more particularly to a process and apparatus for reducing iron ore in solid form directly to metallic iron.

Many processes for reducing iron ore in solid form directly to metallic iron have been proposed but few of them have been commercially successful in competition with the blast furnace. Some of the reasons for this are the necessity of employing extremely pure iron ore and the high cost of available reducing agents as well as the difficulty of controlling the heating of the iron ore and reducing agents to bring these materials to a desired reaction temperature without overheating. Nevertheless, the high quality of the iron or steel produced and the low temperatures at which the process can be carried on, as compared to blast furnace operations, has kept the problem of economically producing sponge iron continually before the industry.

In accordance with the present invention, the ore is carried to its final reduced state at relatively low temperatures by reaction with relatively pure hydrogen and a portion of the heat is supplied to the reaction zone by induction heating to generate heat directly in the particles of iron or iron ore. At least the final portions of the process are carried out under elevated pressure so that improved contact between the reducing gas and the partially reduced ore is accomplished. The process is preferably carried out continuously as the ore is rapidly reduced and a relatively large throughput can be produced in apparatus of small size. Since the materials entering the final reduction zone are at least partly preheated, the load on the induction heating apparatus is small and the induction heating apparatus functions largely as a temperature control. Although the entire reduction operation can be carried out in a single zone in which induction heating is employed, it is advantageous to partly reduce the ore by employing an impure and less expensive hydrogen containing gas and complete the reduction with relatively pure hydrogen.

An object of the invention is therefore to provide an improved process of reducing iron ore in solid form with a gaseous reducing agent.

Another object of the invention is to provide a process of making sponge iron in which iron ore is reduced in solid form by the employment of a gaseous reducing agent and supplying at least a portion of the required heat to the ore by induction heating.

Another object of the invention is to provide an improved process of making sponge iron in which the iron ore is partly reduced with impure hydrogen and the final reduction is carried out with relatively pure hydrogen under pressure.

Another object of the invention is to provide an improved apparatus for reducing divided iron ore in which induction heating is employed for furnishing a part of the heat required to maintain the reaction temperature.

A still further object of the invention is to provide an apparatus for reducing solid iron ore with a gaseous reducing agent in which the ore is passed through refractory insulating tubes and heated therein by induction heating.

Other objects and advantages of the invention will appear in the following description of apparatus suitable for carrying out the invention and shown in the attached drawings of which:

Figure 1:
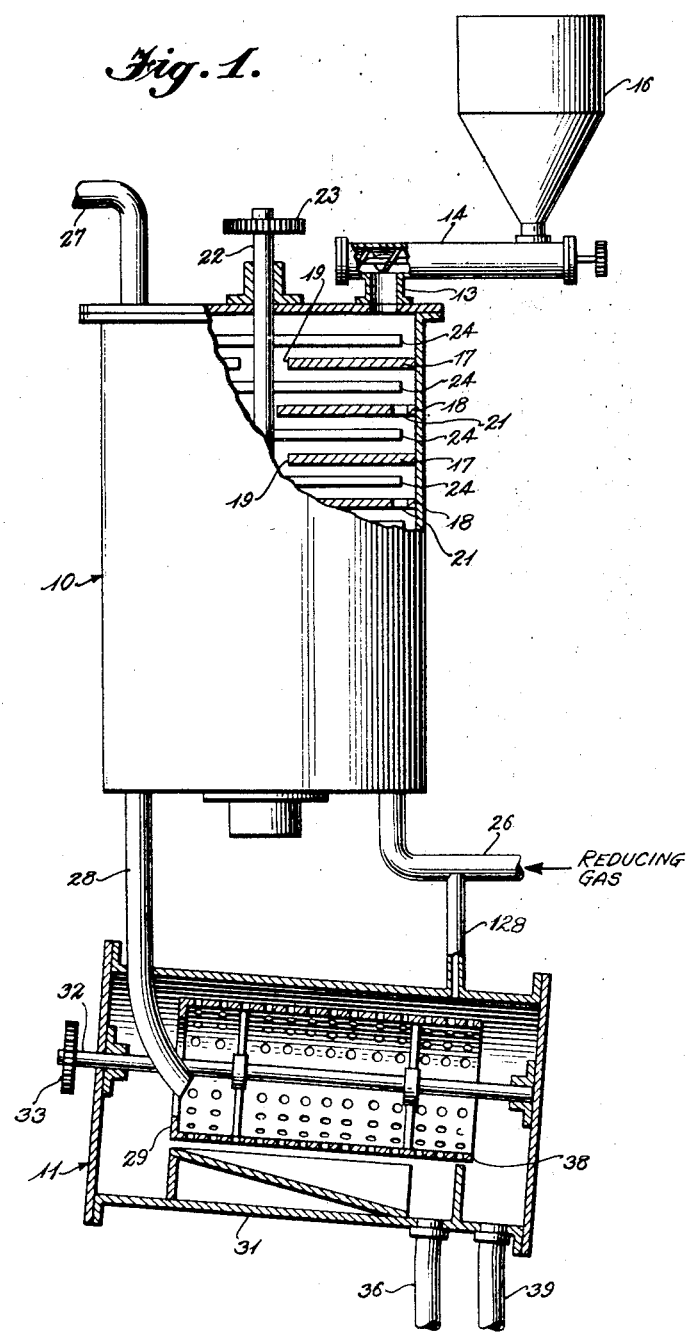
Figure 1 is a diagrammatic view partly in section of a portion of an apparatus suitable for carrying out the present invention.
Figure 4:
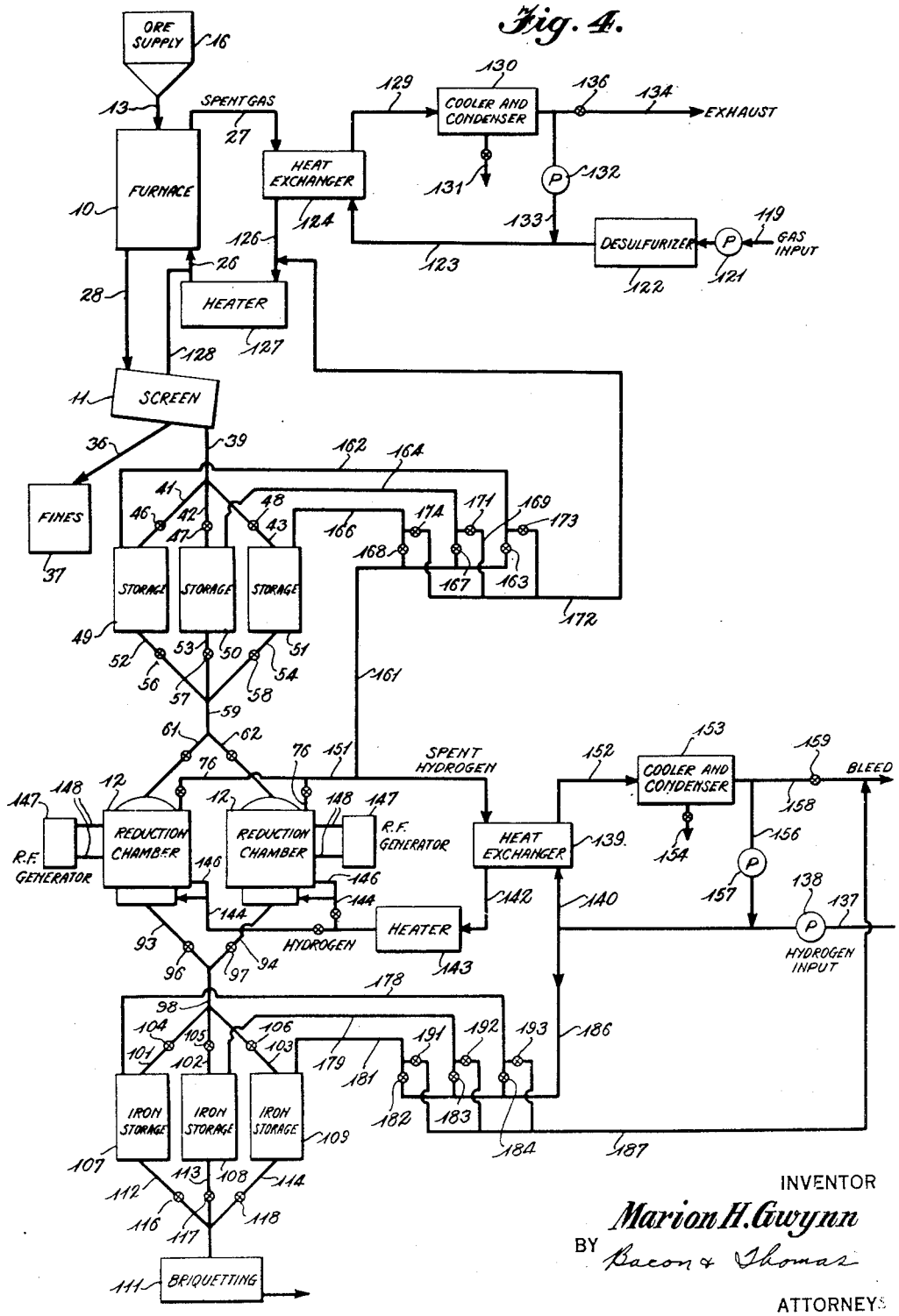
Figure 4 is a schematic diagram of a system suitable for carrying out the present invention.

As shown in Figure 4, the major elements of the apparatus include a reducing furnace 10 which may, for example, be of the conventional Herreshoff type through which the ore may be passed for partial reduction with impure hydrogen; a screening device 11 for separating dust or extremely fine material from the partly reduced ore; and one or more final reduction chambers 12 for substantially completely reducing the ore to metallic form. The furnace 10, shown in more detail in Figure 1, may have an ore inlet 13, the ore being fed to said inlet through a screw conveyor 14 from a hopper 16. The furnace 10 may be provided with a plurality of alternate shelves 17 and 18, the shelves 17 extending inwardly toward the central portion of the furnace and providing openings 19 adjacent the center of the furnace for feeding ore downwardly to the next succeeding shelf 18. The shelves 18 may have openings 21 adjacent the periphery of the furnace for feeding ore downwardly to the next adjacent shelf 17. The furnace 10 may also be provided with a central shaft 22 driven from any suitable source of power, for example, through a gear 23. The shaft 22 may be provided with a plurality of rabble arms 24 positioned between the shelves 17 and 18 so that rotation of the shaft 22 causes downward progression of the ore through the furnace over the surfaces of the shelves 17 and 18. A reducing gas such as an impure hydrogen may be introduced into the bottom of the furnace 10 through a pipe 26. This gas travels upwardly through the furnace in a zigzag path so as to pass through the ore on the shelves 17 and 18 and may be exhausted from the furnace through a pipe 27.

Partly reduced ore may be delivered from the furnace through a conduit 28 into the interior of a rotary screen 29 positioned in a casing 31 of the screening apparatus 11, the rotary screen being mounted upon a shaft 32 driven from any suitable source of power through a gear 33. Fine material passes through the rotary screen 29 and may be discharged from the screening apparatus through a conduit 36 into any suitable receiver 37 (Fig. 4). The material retained on the screen 29 is delivered over the end 38 of the screen and discharged from the casing 31 through a conduit 39 which connects with branch conduits 41, 42 and 43 provided with valves or gates 46, 47 and 48, respectively, in turn connected to storage chambers 49, 50 and 51, respectively. These storage chambers are employed to insure an even supply of partly reduced ore to the reduction chambers 12 and to act as pressure locks as will be hereafter described in more detail. The storage chambers 49, 50 and 51 may discharge through conduits 52, 53 and 54 provided with gates or valves 56, 57 and 58, respectively. The conduits 52, 53 and 54 all connect to a common conduit 59 which in turn connects with branching conduits 61 and 62, each connected to a reduction chamber 12. If desired the portions of the conduits 61 and 62 connected to the chamber 12 may include screw conveyors (not shown) similar to the screw conveyor 14 (Fig. 1) to regulate the feed to the reduction chambers 12.

Figure 2:
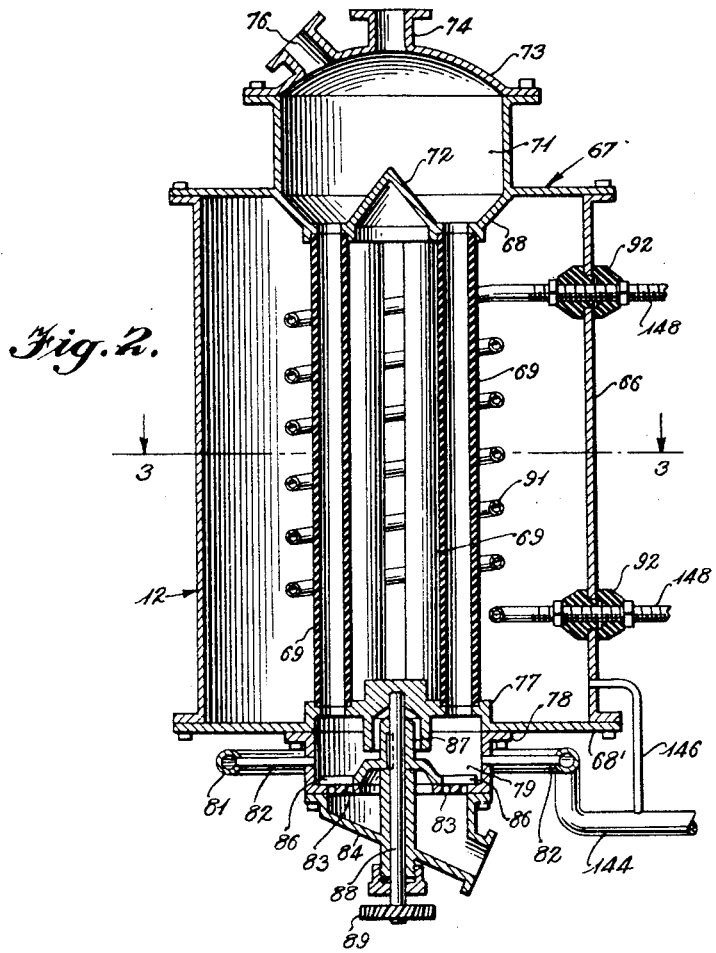
Figure 2 is a vertical section through a reduction chamber employing induction heating.

The details of a reduction chamber 12 are shown in Figure 2. Such a reduction chamber may include a cylindrical pressure-tight casing 66 closed at its top end with an inlet structure 67 and at its bottom with an outlet structure 68'. The inlet structure 67 provides a header 68 for the upper end of a plurality of ceramic tubes 69 made of heat resisting electrical insulating material. The inlet structure also provides an ore feeding and gas separation chamber 71 and a central conically shaped distributor 72 for directing the ore into the tubes 69. The chamber 71 is closed by a cover member 73 providing an ore inlet 74 to which one of the conduits 61 or 62 is connected. The cover member 73 also provides a gas outlet 76.

Figure 3:
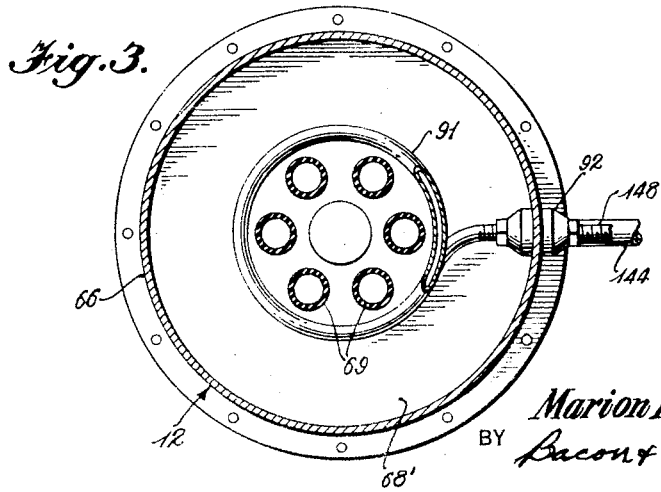
Figure 3 is a horizontal section taken on the line 3—3 of Figure 2.

The lower closure structure 68' provides a header 77 for the lower end of the ceramic tubes 69 and in conjunction with a member 78 secured thereto provides an ore discharge and gas inlet chamber 79. Reducing gas is introduced into the chamber 79 through a circular manifold 81 connected to the chamber 79 through a plurality of pipes 82. The member 78 has a plurality of apertures 83 in its lower portion through which the ore is discharged into an ore discharge member 84 by means of rotary arms 86 carried by a rotary member 87 mounted on a vertical shaft journalled in the header member 77 and discharge member 84, the shaft being driven at a relatively low speed from any suitable source of power through a gear 89. As shown in Figure 3, the ceramic tubes 69 are preferably arranged in a circle and are surrounded by an induction heating coil 91, the coil 91 having its end extending through insulators 92 forming insulating and pressure-tight seals through the walls of the casing 86 and also supporting the coil 91.

Reduced ore is discharged from the reduction chambers through conduits 93 and 94 provided with valves or gates 96 and 97, respectively, one of the conduits 93 and 94 being connected to a discharge member 84 of each reduction chamber 12. The conduits 93 and 94 are connected to a common conduit 98 which in turn is connected to branch conduits 101, 102 and 103 provided with valves or gates 104, 105 and 106, respectively. The conduits 101, 102 and 103 are also connected to storage chambers 107, 108, and 109, respectively, for reduced iron, the chambers 107, 108 and 109 being employed to insure a uniform feed to a briquetting apparatus 111 and as pressure locks for hydrogen gas in the system. The storage chambers 107, 108 and 109 are connected by conduits 112, 113 and 114 provided with gates or valves 116, 117 and 118, respectively, with the briquetting apparatus 111.

The reduction gas employed in the furnace 10 may be a relatively impure gas such as coke oven gas, producer gas, etc., containing approximately 50% or more hydrogen, the remainder being largely carbon monoxide. This gas may enter the system through a conduit 119 and be forced through the system by a pump 121. This gas is preferably first passed through a desulfurizer 122 for removal of sulfur. Such desulfurizers are known in the art and the details thereof are not shown. The reducing gas may be discharged from the desulfurizer through a conduit 123 and passed through a heat exchanger 124 in which it is brought into indirect heat exchange relation with spent gas from the furnace 10. Partially heated gas from the heat exchanger may be delivered through a conduit 126 to a heater 127 in which the gas is brought to the desired temperature for introduction into the furnace 10 through the conduit 26. The conduit 26 may be connected to the interior of the screening device 11 by means of a conduit 128 to maintain the same gas pressure in the screening device as is maintained in the furnace 10. Spent gas withdrawn from the furnace through the conduit 27 may be passed through the heat exchanger 124 in indirect heat exchange relation with fresh reducing gas and then delivered through a conduit 129 to a cooler and condenser 130 employed to remove water vapor from the spent gas. The water resulting from condensation of water vapor in the spent gas may be discharged from the cooler and condenser 130 through a pipe 131. A portion of the cooled spent gas having water vapor largely removed therefrom may be recirculated through the furnace by means of a gas pump or compressor 132 in the conduit 133 connecting with the conduit 123. A substantial portion of the spent gas is, however, exhausted from the system through a conduit 134 provided with a regulating valve 136, the exhausted gas being ordinarily used as a fuel to supply heat, for example, for heating the reducing gas in the heater 127.

The reduction gas employed in the reduction chambers 12 will ordinarily be relatively pure hydrogen obtained from any suitable source. Such hydrogen enters the system through a conduit 137 and may be compressed in the gas pump or compressor 138 and then delivered to a heat exchanger 139 through a conduit 140. The fresh hydrogen is passed in indirect heat exchange with spent hydrogen from the reduction chambers 12 in the heat exchanger 139 and delivered through a conduit 142 to a heater 143 in which the temperature of the hydrogen is raised to that desired in the reduction chambers 12. Heated hydrogen from the heater 143 is delivered through conduits 144 to the reduction chambers 12, one of the conduits 144 being connected to the manifold 81 of each reduction chamber 12. In order to maintain substantially the same pressure on the interior and exterior of the ceramic tubes 69 of the reduction chambers 12, a pipe 146 may connect the conduit 144 with the interior of the casing 66 of the respective reduction chambers. The majority of the heat necessary for reduction in the reduction chambers 12 may thus be furnished by the heated hydrogen supplied thereto but a substantial portion of the heat necessary to reach reaction temperatures may be supplied from the induction heating coils 91 in the chambers 12. As shown in Figure 4, any suitable or known type of radio frequency generators 147 may be connected by conductors 148 to each of the induction coils 91. The induction coils 91 will ordinarily be constructed of copper tubing through which any desired cooling medium may be passed in accordance with conventional practice.

Spent hydrogen may be discharged from the reduction chambers 12 through gas outlets 76 of reduction chambers 12 connected to a common conduit 151 which delivers the spent hydrogen to the heat exchanger 139. The spent hydrogen is passed in indirect heat exchange with fresh hydrogen in the heat exchanger 139 and delivered through a conduit 152 to a cooler and condenser 153. Water vapor is condensed in the cooler and condenser 153 and the resulting water may be discharged therefrom through a pipe 154. The major portion of the spent hydrogen after water vapor has been largely removed therefrom may be recirculated through the system. Thus, cooled spent hydrogen may be returned to the hydrogen inlet conduit 140 through a conduit 156 containing a pump or compressor 157. A small amount of hydrogen is continuously bled from the system through a conduit 158 provided with a regulating valve 159, the discharged hydrogen being ordinarily used as fuel to supply heat, for example, to the heater 143.

The storage chambers 49, 50 and 51 may be used successively to supply partially reduced ore to the reduction chambers 12. The particular storage chamber supplying the reduction chambers 12 is maintained under the same gas pressure as the reduction chambers. In order to accomplish this, the chamber being used as the feed to the reduction chamber, for example the chamber 49, may be connected to the conduit 151 for spent hydrogen through a pipe 161 and a pipe 162 having a valve 163 therein. The other storage chambers 50 and 51 may be provided with pipes 164 and 166 connected thereto and having valves 167 and 168, respectively, for also connecting these pipes to the pipe 161 to bring the storage chambers 50 and 51 to the gas pressure of the reduction chambers before employing these chambers to feed the reduction chambers 12. Another of the storage chambers, for example, the chamber 50, may be in the process of being filled from a screening device 11 during withdrawal of partially reduced ore from the storage chamber 49 and during this time the pressure in the chamber 50 is maintained the same as that in the screening device 11. This is accomplished by connecting the chamber 50 through the pipe 164 and a pipe 169 having a valve 171 therein to a pipe 172 in turn connected to the lower pressure gas system of the furnace 10, for example, to the pipe 126. Thus, when the storage chamber 49 is being employed to feed the reduction chambers 12, the valve 46 in its inlet ore conduit 41 is closed and the valve 56 in its outlet ore conduit 52 is open, the valves 57 and 58 in the conduits 53 and 54 being closed. Also, the valve 163 in the pipe 162 is opened to maintain the pressure in the storage chamber 49 substantially the same as that in the reduction chamber 12 and the valve 173 in the pipe connecting pipes 162 and 172 is closed to prevent loss of hydrogen to the low pressure furnace system.

During this time, the storage chamber 51 may be receiving ore from the screening device 11 through the conduits 39 and 43, the valve 48 being opened. The storage chamber 51 may at this time have its pressure approximately the same as that in the furnace 10 by being connected through the pipe 166, open valve 174 and pipe 172 to the conduit 126, the valve 168 being closed. It is assumed that the storage chamber 50 has been previously filled from the screening device 11. By closing valve 171 and opening valve 167, this storage chamber may be brought to the pressure existing in the reduction chambers 12 so that it is ready to be employed to feed the reduction chambers 12 by opening the valve 57, feed from the storage chamber 49 being simultaneously discontinued by closing the valve 56. Storage chamber 49, is then ready to receive partially reduced ore from the screening device as soon as the pressure therein has been reduced and storage chamber 51 has been filled. It will be seen that one of the storage chambers can be employed as a source of partially reduced ore for the reduction chambers 12 while another storage chamber is being filled and the third chamber is being brought to the correct pressure depending upon whether it is to receive ore from the screen 11 or discharge ore to the reduction chamber 12. Thus, the chambers 49, 50 and 51 are employed in succession to receive ore from the screen 11 and to discharge ore to the reduction chambers 12, the storage chambers functioning as pressure locks for the reduction chambers 12 to prevent continuous leakage of high pressure hydrogen from the reduction chambers 12 into the low pressure system of the furnace 10.

The briquetting apparatus 111, which may be any known or suitable apparatus for this purpose is ordinarily operated at substantially atmospheric pressure and the storage chambers 107, 108 and 109 may be employed in substantially the same manner as the storage chambers 49, 50 and 51. Thus, the storage chambers 107, 108 and 109 are provided with pipes 178, 179 and 181, respectively, connected thereto, these pipes being provided with valves 182, 183 and 184 establishing communication with a pipe 186 connected to the pipe 140 from the compressor 138. The pipes 178, 179 and 181 may also be connected with a pipe 187 leading to the hydrogen exhaust pipe through valves 191, 192 and 193, respectively. By opening and closing the appropriate valves, the storage chambers 107, 108 and 109 may be independently brought to the pressure existing in the reduction chambers 12 or the pressure in the briquetting apparatus 111. One of these chambers may be employed to receive reduced ore from the reduction chambers while the second is discharging to the briquetting apparatus and still a third is having its pressure adjusted to the desired pressure, these chambers also functioning as pressure locks for the reduction chambers 12 to prevent continuous leakage of hydrogen to the briquetting apparatus.

The amount of ore passed through the furnace 10 is primarily determined by the speed of rotation of the shaft 22. The screening apparatus 11 should be of sufficient capacity to handle all of the ore fed from the furnace 10. The amount of ore passed through the reduction chambers 12 is primarily determined by the rotation of the shafts 88 thereof. Thus, the speeds of rotation of the shafts 22 and 88, all of which are rotated at relatively low speeds, should be correlated to maintain the amount of ore passing through the furnace 10 substantially the same as the amount of ore passed through the reduction chambers 12.

As stated above, a relatively impure gas such as coke oven gas or producer gas can be employed for partial reduction in the furnace 10. In general, the temperature in the furnace 10 will range between 1000 and 1100° F. although in some cases temperatures between approximately 900 and 1200° F. may be employed. It is preferred to partially preheat the ore entering the furnace 10 by any known or suitable means, the remaining heat necessary to bring the ore and gas to reaction temperatures being supplied by heating the reduction gas. The reduction gas ordinarily enters the furnace at a temperature between approximately 1200 and 1300° F. The heat of this gas in conjunction with any heat contained in the ore entering the furnace maintains the reaction temperature and compensates for radiation and other heat losses from the furnace 10. The furnace 10 is ordinarily operated at substantially atmospheric pressure or at most a few pounds per square inch above atmospheric pressure in order to retard decomposition of carbon monoxide with resulting deposition of carbon powder and under these conditions it is relatively easy to maintain the reaction temperature in the furnace 10 at or near the desired reaction temperature.

It is desirable to maintain the ore during partial reduction and, while in the partially reduced state, out of contact with the atmosphere. The screening apparatus 11 is therefore substantially closed from the atmosphere and kept filled with reducing gas by the conduit 128. To prevent building up excessive amounts of carbon monoxide in the reducing gas, a substantial portion of the spent reducing gas is discharged from the process through the pipe 134. For example, amounts of spent reducing gas ranging from 40 to 60% of this gas will be discharged and used as fuel, the remaining being recycled through the process through the conduit 133.

The partially reduced ore is discharged from the furnace at a temperature between approximately 1000 and 1100° F. and although there is some reduction in the temperature of the ore in the screening apparatus 11 and storage chambers 49, 50 and 51 due to heat radiation, it is preferred to maintain the temperature of the ore entering the reduction chambers 12 as near these temperatures as practicable. On entering the reduction chamber through the inlet 74, the partially reduced ore falls upon the distributor 72 and is directed into the ceramic tubes 69. This ore passes downwardly through the tubes 69 and is received in the chamber 79 from which it is discharged through the apertures 83 at a rate controlled by the rotating arms 86. Reducing gas in the form of substantially pure hydrogen, after being heated in the heat exchanger 139 and heater 143, is introduced into the chamber 79 through the pipes 82. The incoming hydrogen passes upwardly through the tubes 69 counter-current to the movement of ore and then separates from the ore in the inlet chamber 71. The spent hydrogen is exhausted through the outlet 76 and then passes in indirect heat exchange with the incoming gas in the heat exchanger 139 after which it is treated to remove water vapor in the cooler and condenser 153, most of the hydrogen being returned to the process through the conduit 156. A small portion of this gas, for example, 5 to 10% is discharged from the process through the conduit 158 in order to prevent the building up of impurities in the system.

The ore entering the reduction chambers 12 is ordinarily at a relatively high temperature and the reducing reaction is endothermic. Also the reducing gases are heated before introduction into the reduction chambers 12. Very accurate temperature control is, however, required in order to produce substantially complete reduction of the ore while avoiding sintering, the exact temperature to be employed for best results varying with the nature of the ore being reduced. It is, of course, possible to obtain a sufficiently high temperature in the reduction chamber 12 by preheating the ore or reduction gases or both, but it is extremely difficult to maintain a desired reaction temperature under such conditions. By employing induction heating to generate, directly in the particles of the partially reduced iron ore, a substantial portion of the heat required to bring the ore to the desired temperature, very accurate temperature control can be obtained. That is to say, the generation of heat by induction heating can be instantly stopped when the temperature starts to rise above the desired temperature and immediately again started when the temperature begins to drop. By using a relatively low radio frequency, for example, a frequency between 100 kc. and 1000 kc., the magnetic field developed by the coil 91 penetrates substantially uniformly throughout the ore mass in the tubes 69 to provide substantially uniform heating. The exact frequency employed will depend upon the electrical conductive properties of the particular particles being treated and their size so that the optimum frequency for a given installation will ordinarily be determined empirically. In some cases, it may be possible to employ frequencies as low as 15 kc.

The final reduction stage in the reduction chambers 12 is preferably carried on at elevated pressures, for example, pressures between 30 and 40 atmospheres. At these pressures, a relatively slow flow of gas can be employed so that the gas can be readily separated from the ore in the inlet chamber 71. Also, the higher pressures promote contact between the ore and the reducing gas and by employing relatively pure hydrogen, no deposition of carbon is produced. The ceramic tubes 69 are not subjected to any large differential pressure as the interior of the casing 66 is maintained at substantially the same pressure as the interior of the tubes 69. The external pressure will, in general, be somewhat larger than the internal pressure due to the friction drop of gases passing through the ore but any slight leakage of gas into the tubes or the chambers 71 or 79 at the joints between the ceramic tubes and the headers 68 and 77 is not material as the gases contacting the interior and exterior of the tubes are substantially the same.

The temperature of reaction in the reaction chambers 12 will ordinarily fall between 1000 and 1100° F. although in some cases temperatures as low as 900° F. and in other cases as high as 1200° F. may be employed. The maximum temperature employed must be below that at which substantial sintering is produced in order to prevent blocking or "hanging" of ore in the tubes 69 although slight sintering can be tolerated as the adhered particles will ordinarily be separated by the rotating arms 86 in the discharge chamber 79 of the reaction chamber. These arms keep the ore in constant movement through the tubes 69 to prevent the blocking or hanging referred to above. Also, the tubes 69 are preferably constructed to have a slight internal taper so that their internal diameter is somewhat larger at the bottom or discharge portion of the tubes than it is at the top or inlet portion of the tubes. This taper in conjunction with the intermittent agitating action of the arms 86 of the rotary member 87 as they pass below the discharge openings of the tubes 69 is, with most ores, sufficient to prevent blocking of the powdered ore in the tubes so that the ore moves substantially uniformly through the tubes.

Certain ores may exhibit a pronounced tendency to resist uniform flow through the tubes due to partial sintering or other causes, in which case any known or suitable means may be employed to prevent blocking of the tubes. For example, rotary or reciprocable rods of ceramic or other heat resisting insulating material may extend into or through the tubes and be arranged for intermittent or substantially continuous movement, for example, from the rotating member 87, to agitate the ore in the tubes and maintain it in substantially uniform movement therethrough. Alternatively, the entire reaction chamber 12 may be positioned horizontally or at an inclination to the horizontal with the discharge end lower than the inlet end, and suitably driven rotating screw or similar members made of ceramic or other heat resisting insulating material employed to advance the ore through the tubes.

It theoretically requires approximately 16,000 cubic feet of hydrogen at atmospheric pressure to reduce a ton of iron ore but in practice approximately 18,000 to 20,000 cubic feet of hydrogen are required since all of the hydrogen can not be effectively employed. By partially reducing the ore with impure hydrogen as disclosed above, the amount of substantially pure hydrogen can be materially reduced, the cost of pure hydrogen being largely the determining factor in the cost of the process. Thus, from 50% to 70% of the reduction can be rapidly and easily produced in the furnace 10 by employing relatively cheap impure hydrogen and the final reduction accomplished by relatively pure hydrogen. It is extremely difficult, if not impossible, to substantially completely reduce the ore with inexpensive impure hydrogen. By the operation described above, the pure hydrogen demand per ton of ore may, however, be reduced from 50 to 70% from that required when pure hydrogen is employed throughout the process. In the present process both the partial reduction in the furnace 10 and the substantially complete reduction in the chambers 12 are rapid operations so that the throughput of the combined process is much greater than would be the case if the entire reduction were carried on in either major step even though the size of the apparatus for either of these steps were increased commensurably.

Ore in relatively finely divided form, the condition in which iron ore concentrates are usually obtained, can be effectively handled in the present case. The furnace 10 can handle ore as fine as 200 mesh, although a coarser ore, for example, 10 to 60 mesh is more easily handled. An ore which is predominantly 40 to 60 mesh is best handled by the furnace 10 although a substantial portion of finer ore may be present. The reduction chambers 12 can also handle relatively fine material as the tubes 69 may be relatively short so that the gas pressure differential between the ends of the tubes is not excessive. Due to the agitation of the ore in the furnace 10, a small amount of extremely fine material is produced and this tends to retard gas flow through the tubes 69 in the reduction chambers 12. The screening apparatus 11 should therefore remove substantially all ore particles which are less than 200 mesh.

It is entirely possible to carry out the entire reduction process in the reduction chambers 12 in which case the primary reduction furnace 10 can be eliminated. Even so, the amount of heat required to be introduced into the ore by induction heating is small. Iron ore particles are, in general, of sufficient electrical conductivity to be subject to induction heating by an alternating magnetic field, and in any case the reduction chambers 12 can be initially charged with partially reduced ore so that fresh ore entering the chambers is partially reduced by hot reducing gases passing therethrough before entering the magnetic field. By employing the heat exchanger 139, preheating the ore and insulating the reduction chambers as far as possible against loss of heat by radiation, the process of the present invention can be successfully carried out even with no partial reduction of ore before it is introduced into the reduction chambers 12. The induction heating is employed primarily as a temperature control for the process. By varying the electric power supplied to the heating coils 91 in accordance with the temperature of the ore in the reduction chambers, a substantially constant reaction temperature may be maintained therein.

While I have disclosed the preferred embodiment of my invention, it is understood that the details thereof may be varied within the scope of the following claim.

I claim:

Apparatus for reducing finely divided ore, which comprises, a pressure chamber, a plurality of vertically extending ceramic tubes positioned in said pressure chamber, upper and lower headers for said tubes, means for passing ore through said tubes, means for passing a reducing gas under pressure through the ore in said tubes and for maintaining a gas pressure in said pressure chamber substantially equal to the pressure of the gas in said tubes, an induction coil supported in said pressure chamber and surrounding said tubes, and means for supplying alternating current power to said induction coil to generate heat in the particles of said ore.

MARION H. GWYNN.

REFERENCES CITED

The following references are of record in the file of this patent:

UNITED STATES PATENTS

| Number | Name | Date |
|---|---|---|
| 764,044 | Diesler | July 5, 1904 |
| 1,090,874 | Pier | Mar. 24, 1914 |
| 1,286,135 | Somermeier | Nov. 26, 1918 |
| 1,759,173 | Smith | May 20, 1930 |
| 2,122,241 | Arnold | June 28, 1938 |
| 2,142,100 | Avery | Jan. 3, 1939 |
| 2,144,618 | Clark | Jan. 24, 1939 |
| 2,166,207 | Clark | July 18, 1939 |
| 2,236,474 | Hardy | Mar. 25, 1941 |
| 2,243,110 | Madaras | May 27, 1941 |
| 2,266,002 | Clark | Dec. 16, 1941 |
| 2,282,144 | Fahrenwald | May 5, 1942 |
| 2,291,532 | Clark | July 28, 1942 |
| 2,338,606 | Voorhees | Jan. 4, 1944 |
| 2,359,578 | Payne | Oct. 3, 1944 |
| 2,455,092 | Ramseyer | Nov. 30, 1948 |

OTHER REFERENCES

Transactions of the American Institute of Mining and Metallurgical Engineers, vol. 135, pages 58–72 (1939).